United States Patent [19]

Tischer et al.

[11] Patent Number: 5,398,594
[45] Date of Patent: Mar. 21, 1995

[54] VOLUME FLOW CONTROL FOR HYDRAULIC SYSTEMS OF VEHICLES, ESPECIALLY FOR STEERING DEVICES OF MOTOR VEHICLES

[75] Inventors: Dieter Tischer, Wendlingen; Bernd Niethammer, Nürtingen, both of Germany

[73] Assignee: Hydraulik-Ring Antriebs- und Steuerungstechnik GmbH, Nürtingen, Germany

[21] Appl. No.: 150,492

[22] Filed: Nov. 10, 1993

[30] Foreign Application Priority Data

Nov. 10, 1992 [DE] Germany .......... 42 37 932.6

[51] Int. Cl.6 .................................... F15B 11/16
[52] U.S. Cl. ............................. 91/516; 60/422; 137/118
[58] Field of Search ............. 60/422; 91/516, 532, 91/446; 137/118

[56] References Cited

U.S. PATENT DOCUMENTS 4,232,701  11/1980  Adachi .................. 60/422

FOREIGN PATENT DOCUMENTS 2704326  2/1977  Germany .
2943317  10/1979  Germany .

Primary Examiner—F. Daniel Lopez
Attorney, Agent, or Firm—Robert W. Becker & Associates

[57] ABSTRACT

A volume flow control for a hydraulic system of a vehicle has a pump for supplying a main consuming device and an auxiliary consuming device with a hydraulic medium. A valve having a main connection for connecting the pump to the main consuming device an auxiliary connection for connecting the pump to the auxiliary consuming device and is provided. The valve has a main piston with a throttle and an auxiliary piston positioned downstream of the throttle. The throttle is positioned within the auxiliary connection. The auxiliary connection is pressurized by the main piston. The auxiliary piston has a first end face, subjected to the operational pressure of the hydraulic medium, and a second end face, biased by at least one pressure spring and subjected to a reduced pressure of the hydraulic medium caused by the throttle. With this arrangement, the auxiliary piston is positioned such that, independent of the operational pressure, a substantially constant amount of hydraulic medium is supplied to the auxiliary consuming device when switched on.

18 Claims, 2 Drawing Sheets

5,398,594

VOLUME FLOW CONTROL FOR HYDRAULIC SYSTEMS OF VEHICLES, ESPECIALLY FOR STEERING DEVICES OF MOTOR VEHICLES

BACKGROUND OF THE INVENTION

The present invention relates to a volume flow control for hydraulic systems of vehicles, especially for steering devices of motor vehicles, having a pump supplying a main consuming device and at least one auxiliary device with a hydraulic medium that flows via a main connection to the main consuming device and via an auxiliary connection through a valve having at least one throttle to the auxiliary device. The auxiliary connection is pressurized by a main piston.

In such known devices a stationary orifice is provided within a valve housing in front of a main piston through which the auxiliary volume flow in direction to the auxiliary consuming device is branched off from the main volume flow. When the auxiliary consuming device is turned on, the branched-off auxiliary volume flow is returned to the main piston which is thus displaced in the direction toward the stationary orifice and thus pressurizes the hydraulic medium that is located between the orifice and the main piston. Depending on the magnitude of the pressure a varying amount of hydraulic medium flows through the throttle location of the orifice to the auxiliary consuming device. The throttle cross-section is large in order to ensure that a sufficiently high pressure and a sufficiently high amount of hydraulic medium can reach the auxiliary consuming device when the main consuming device operates at a low operational pressure. This results in that for a higher operating pressure the amount of hydraulic medium flowing to the auxiliary consuming device is also correspondingly higher so that for the main consuming device only a respectively reduced amount of hydraulic medium is available. This may result in a reduced operability of the main consuming device. For example, when the main consuming device is the steering device of a motor vehicle, the steering velocity four a respectively reduced amount of hydraulic medium is thus reduced.

It is therefore an object of the present invention to improve the volume flow control of the aforementioned kind such that independent of the operational pressure at the main consuming device the required amount of hydraulic medium can always be supplied to the auxiliary consuming device.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
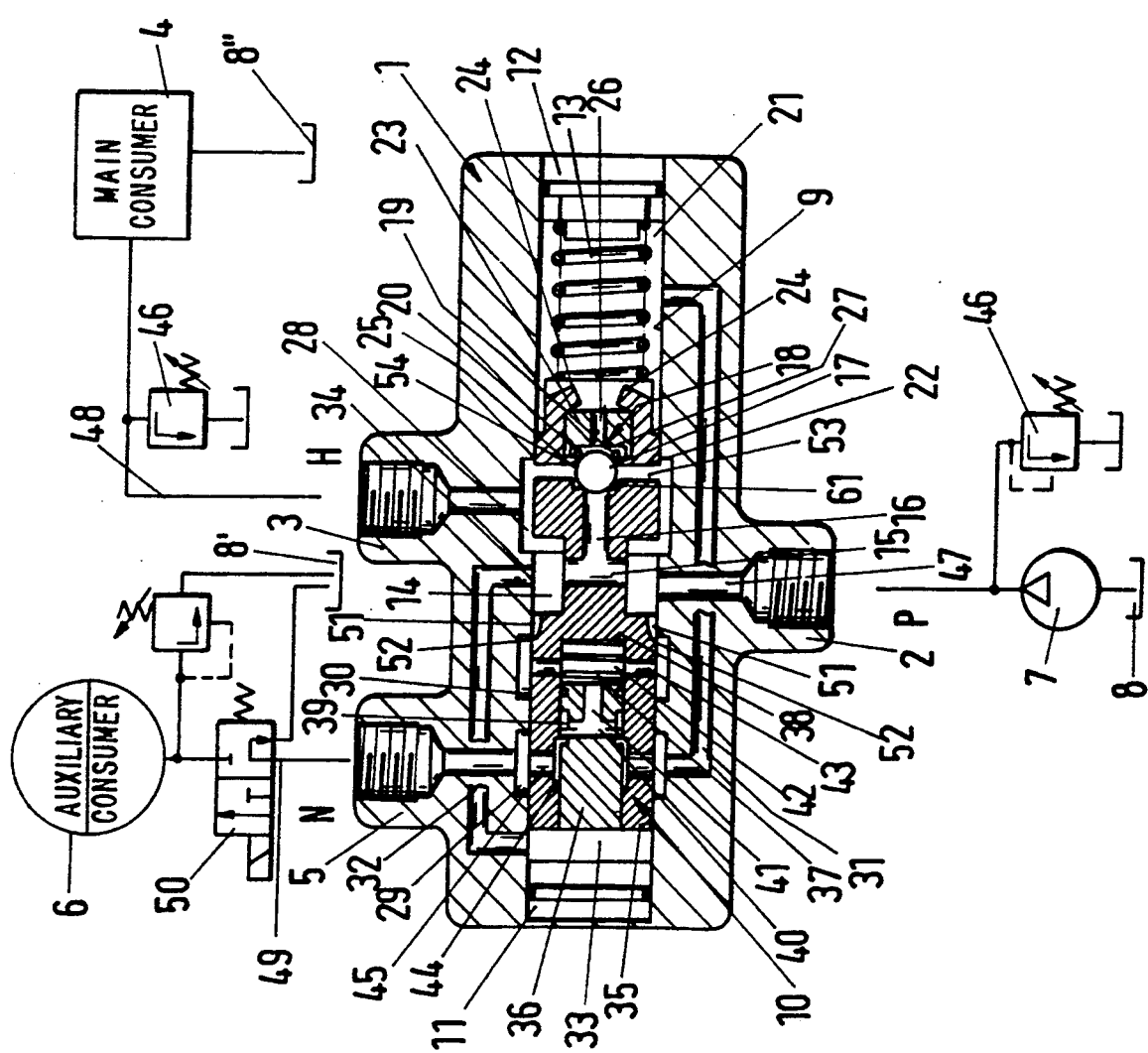
FIG. 1 is an axial section of a first embodiment of the inventive volume flow control.

The volume flow control for a hydraulic system of a vehicle according to the present invention is primarily characterized by:

A pump for supplying a main consuming device and an auxiliary consuming device with a hydraulic medium;

A valve having a main connection for connecting the pump to the main consuming device and an auxiliary connection for connecting the pump to the auxiliary consuming device;

The valve comprising a main piston, the main piston having a throttle, and an auxiliary piston positioned downstream of the throttle;

The throttle positioned in the auxiliary connection;

The auxiliary connection being pressurized by the main piston; and

The auxiliary piston having a first end face, subjected to an operational pressure of the hydraulic medium, and a second end face, biased by at least one pressure spring and subjected to a reduced pressure of the hydraulic medium caused by the throttle, so that the auxiliary piston is positioned such that, independent of the operational pressure, a substantially constant amount of hydraulic medium is supplied to the auxiliary consuming device when switched on.

Preferably, the main piston has a first end face that is subjected to the same operational pressure as the first end face of the auxiliary piston.

Advantageously, the second end face of the auxiliary piston delimits a chamber. The main piston has a pressure chamber for receiving a pressure spring therein for biasing the main piston. The chamber delimited by the auxiliary piston and the pressure chamber of the main piston communicate with one another.

Preferably, the auxiliary piston is slidably connected within the main piston. Expediently, the first end face of the main piston has a recess in which recess the auxiliary piston is positioned. Preferably, a pressure spring for biasing the auxiliary piston is positioned in the chamber delimited by the auxiliary piston and is supported at the bottom of the recess.

In a preferred embodiment of the present invention, the auxiliary piston has an annular groove and a connecting line extending axially in the auxiliary piston for connecting the chamber delimited by the auxiliary piston with the annular groove. Preferably, the auxiliary connection comprises a connector for the auxiliary consuming device and the annular groove is communicating with the connector for the auxiliary consuming device.

Expediently, the annular groove of the auxiliary piston is connected with at least one line to the pressure chamber of the main piston.

The volume flow control preferably further comprises a safety device for opening a safety line connecting the pump to the main consuming device when the main piston jams.

Preferably, the safety device is connected within the main piston. Expediently, the main piston has an annular groove that is connected via the safety line to an inlet line of the main consuming device. Advantageously, the annular groove of the main piston has the throttle.

In a preferred embodiment of the present invention, the safety line is comprised of bores extending through the main piston.

Expediently, the safety device comprises a valve component for closing the safety line. The valve component is preferably a valve ball.

The safety device preferably comprises a diaphragm at which the valve component rests. The pressure acting on a side of the diaphragm opposite the valve component is preferably controlled by a switch valve. Expediently, the surface area of the valve component subjected to the pressure of the hydraulic medium in the safety line is smaller than an oppositely arranged surface area of the diaphragm at which the valve component rests.

In an advantageous embodiment of the present invention, the hydraulic medium within the auxiliary connection flows backs into a reservoir when the auxiliary consuming device is turned off.

Accordingly, in the inventive volume flow control, when the auxiliary consuming device is switched on., substantially a constant amount of hydraulic medium flows to the auxiliary consuming device independent of the operational pressure. Accordingly, it is ensured that independent of the operational pressure, the main consuming device is always supplied with substantially the same amount of hydraulic medium. The main consuming device is thus optimally supplied with hydraulic medium. The auxiliary piston is loaded on both sides with different pressures so that it is automatically positioned such that the supply of hydraulic medium to auxiliary consuming device is substantially constant. The auxiliary piston is automatically adjusted such, independent of the operational pressure at the main consuming device, that the supply of hydraulic medium to the auxiliary consuming device is pressure independent. When the main consuming device is, for example, a steering device of a motor vehicle, there is always a sufficient amount of hydraulic medium for operating the steering device present so that a reduction of the steering velocity will not occur. On the other hand, the auxiliary consuming device is always supplied with a sufficient amount of hydraulic medium.

DESCRIPTION OF PREFERRED EMBODIMENTS

The present invention will now be described in detail with the aid of several specific embodiments utilizing FIGS. 1 and 2.

A volume flow control is used in hydraulic systems of motor vehicles and is preferably employed for the steering device of motor vehicles. The control has a valve housing 1 having a pump connector 2, a connector 3 to the main consuming device 4 and a connector 5 to the auxiliary consuming device 6. In the represented embodiment the main consuming device 4 is the steering valve of a steering system of a motor vehicle. The auxiliary consuming device 6, for example, may be the level control or an adjusting system for rearwheel steering of a motor vehicle. Both consuming devices 4, 6 have a common pump 7 which pumps the hydraulic medium from a reservoir 8.

Within the valve housing 1 a valve bore 9 is provided in which a main piston 10 is slidably connected. The valve bore 9 is closed off at both ends by a respective stopper 11, 12. A pressure spring 13 is supported at the stopper 12 and rests with its other end at the main piston 10.

The main piston 10 is provided with an annular groove 14 between its end faces and has a transverse bore 15 in the area of the annular groove 14 which diametrically penetrates the main piston 10. An axial bore 16 opens into the transverse bore 15 and is closed off at its end remote from the transverse bore 15 by a valve component 17, preferably a valve ball. The valve component 17 is a component of a safety device 18 which ensures that, when the main piston 10 jams, the main consuming device 4 can still be operated properly. The valve component 17 rests at a diaphragm 19 positioned at a side opposite the axial bore 16. The diaphragm 19 is positioned in a recess 20 of the main piston 10 which is open in the direction toward the pressure chamber 21 for receiving the pressure spring 13. The diaphragm 19 rests with its edge on a bottom 22 of the recess 20. The edge of the diaphragm is clamped between the bottom 22 and a clamping device 23 that is positioned in a depression 20 and is secured therein in a suitable manner. In the represented embodiment brackets 24 are bent from the rim of the depression 20 to engage the clamping device 23 by pressing it firmly against the rim of the diaphragm. The clamping device 23, of course, may be secured in any other suitable manner. The clamping device 23 rests with its mantle surface in a sealing manner at the sidewall of the depression 20. The rim portion 25 of the clamping piece 23 that clamps the edge of the membrane is in the form of a projecting circumferential ring which extends past the respective end face of the clamping piece. Accordingly, the valve component 17 in the closed position represented in the drawing, is spaced from the clamping piece 23 so that for opening the axial bore 16 it can be lifted off its valve seat 61. The clamping piece 23 is penetrated by at least one axial bore 26 which connects the pressure chamber 21 with the pressure chamber 27 that is positioned between the membrane 19 and the neighboring end face of the clamping piece 23.

The connector 3 of the main consuming device 4 is connected to an annular chamber 28 that is provided in the wall of the valve bore 9. The connector 5 for the auxiliary consuming device 6 is connected with an annular chamber 29 in the wall of the valve bore 9. In the area between the two annular chambers 28 and 29 a third annular chamber 30 is provided in the wall of the valve bore 9.

The annular chamber 29 coordinated with the connector 5 is connected via a line 31 extending through the valve housing 1 to the pressure chamber 21 that contains the pressure spring 13. Furthermore, the valve housing 1 is provided with a line 32 having one end 34 that opens into the valve bore 9 in the area between the two connectors 3 and 5. The other end of the line 32 opens into a pressure chamber 33 that is provided between the stopper 11 and the neighboring end of the main piston 10.

The main piston 10, at its end face facing the pressure chamber 33, is provided with an axial recess 35 in which an auxiliary piston 36 is slidably supported. The auxiliary piston 36 is subjected to the hydraulic medium pressure within the pressure chamber 33 and is loaded within the recess 35 by a pressure spring 37 that is supported at the bottom 38 of the recess 35. The auxiliary piston 36 has an annular groove 39 into which a transverse bore 40 that extends diametrically through the auxiliary piston 36 opens. The transverse bore 40 communicates via an axial bore 41 of the auxiliary piston 36 with a chamber 42 in which the pressure spring 37 is arranged. A transverse bore 43 diametrically penetrating the main piston 10 opens into this chamber 42.

In the sidewall of the recess 35 of the main piston 10 an annular chamber 44 is provided into which a further diametrical bore 45 of the main piston 10 opens.

The pump 7 is provided with a relief valve 46 arranged downstream of the pump that limits the pressure within the pump connecting line 47 to a certain value. This relief valve 46 may also be provided in a line 48 between the connector 3 of the main consuming device and the main consuming device 4, as represented in the drawing.

In the line 49 extending from the connector 5 to the auxiliary consuming device 6 a switch valve 50 is provided with which the auxiliary consuming device may be turned on.

In the rest position, when the pump 7 is not turned on, the main piston 10 is biased by the force of the pressure spring 13 to abut with its end face at the stopper 11. The auxiliary piston 36 positioned within the main piston 10 is also forced by the force of the pressure spring 47 against the stopper 11. As soon as the pump 7 is turned on, the pump 7 supplies hydraulic medium from the reservoir 8 via the pump connecting line 47 into the annular groove 14 of the main piston 10 and via the line 32 into the pressure chamber 33 so that the main piston 10 is displaced against the force of the pressure spring 13. In this position the hydraulic medium flows from the annular groove 14 of the main piston 10 into the annular chamber 28 of the valve housing 1 and from there via the connector 3 for the main consuming device into the line 48 to the main consuming device 4. Furthermore, the hydraulic medium flows via the transverse bore 15 in the main piston 10 into its axial bore 16.

The annular groove 14 of the main piston 10 is provided on its side facing the auxiliary piston 36 with orifice plates 51. They are designed such that in the position of the main piston 10 shown in the drawing, a connection between the annular groove 14 of the main piston 10 and the annular chamber 30 of the valve housing 1 is provided. The orifice plates 51 have only a very small throttle cross-section so that only a small amount of hydraulic medium can flow via the throttle 52 into the annular chamber 30. This annular chamber 30 is connected via a transverse bore 43 with the chamber 42 into which the axial bore 41 of the auxiliary piston 36 opens. Due to this arrangement, the hydraulic medium from the annular chamber 30 can flow via the axial bore 41 into the transverse bore 40 of the auxiliary piston 36 and from there into the annular groove 39 of the auxiliary piston. The annular groove 39 is in flow connection with the annular chamber 44 of the main piston 10. From the annular chamber 44 the hydraulic medium can flow via the diametrical bore 45 of the main piston 10 into the annular chamber 29 of the valve housing 1 and from there via the connector 5 for the auxiliary consuming device into the line 49. The switch valve 50, as long as the auxiliary consuming device 6 is not turned on, is switched such that the hydraulic medium is returned to the reservoir 8'. Since the auxiliary consuming device 6 in the position shown in the drawing is not switched on, the hydraulic medium flows without pressure within the line 49.

From the annular groove 39 of the auxiliary piston 36 the hydraulic medium also flows into the line 31 which connects the annular chamber 29 of the valve housing 1 with a pressure chamber 21. As long as the main consuming device 4 and the auxiliary consuming device 6 are not operated, the hydraulic medium flows through the different lines without pressure. The hydraulic medium flowing via the line 48 to the main consuming device 4 is also returned without pressure into the reservoir 8".

The hydraulic medium present within the pressure chamber 21 flows through the axial bore 26 of the clamping piece 23 against the diaphragm 19 at which the valve component 17 rests. The membrane surface area which is in contact with the valve component 17 is substantially greater than the surface area of the valve component 17 loaded by the hydraulic medium within the axial bore 16 of the main piston 10, so that in the closed position represented in the drawing the valve component 17 is securely held in its position. The hydraulic medium flows furthermore from the annular chamber 28 of the valve housing 1 into a diametrical bore 53 of the main piston 10 which at half its length is provided with a receiving room 54 that is connected to the axial bore 16 for the valve component 17. Via this flow connection the hydraulic medium can thus flow also into this receiving room 54.

The main consuming device 4 as well as the auxiliary consuming device 6 are supplied with the required hydraulic medium with the only pump 7. The main flow of the hydraulic medium flows to the main consuming device 4 via the pump connecting line 47, the annular groove 14, the annular chamber 28, and the line 48. An auxiliary stream is branched off this main stream to the auxiliary consuming device 6. The hydraulic medium flows for this purpose from the annular groove 14 of the main piston 10 via the throttle 52 into the annular chamber 30, the transverse bore 43, the axial bore 41 of the auxiliary piston 36, the annular groove 39 of the auxiliary piston 36, the annular chamber 44 of the main piston 10, its transverse bore 45, the annular chamber 29 of the valve housing 1, and the connector 5 for the auxiliary consuming device into the line 49. Since the hydraulic medium can flow only via the throttles 52 from the annular groove 14 of the main piston 10 in direction toward the auxiliary consuming device 6, only a small amount of hydraulic medium can flow to the auxiliary consuming device. When the auxiliary consuming device 6 is not turned on, an amount of only, for example, 100 $cm^3$/min. will flow, while to the main consuming device 4, for example, an amount of 8,000 $cm^3$/min. will flow. Accordingly, a sufficiently great amount of hydraulic medium is supplied to the main consuming device 4 so that it can be operated safely.

Since the main piston 10 as well as the auxiliary piston 36 both have an end face facing the pressure chamber 33, both pistons are loaded at these end faces with the same pressure. Due to this pressure of the hydraulic medium within the pressure chamber 33 the main piston 10 is loaded against the force of the pressure spring 13 and the auxiliary piston 36 is loaded against the force of the pressure spring 37. The auxiliary piston 36 is loaded on one end face by the pressure medium within the pressure chamber 33, while the other end face is subjected to the hydraulic medium present in the chamber 42 as well as the pressure spring 37. The pressures acting on either end face of the auxiliary piston 36 are different so that the auxiliary piston 36 is positioned in a corresponding balanced position relative to the main piston 10 and is maintained in this balanced position depending on the pressure differential at its end faces. This balanced position is determined such that the annular groove 39 of the auxiliary piston 36 is constantly in connection with annular chamber 29 of the valve housing 1.

As long as the main consuming device 4, for example, a steering device of a motor vehicle, is not in operation, the hydraulic medium flows without pressure to the reservoir 8".

In order to turn on the auxiliary consuming device 6, the switch valve 50 is switched manually or with a corresponding impulse, for example, an electric impulse. Hydraulic medium then flows via the connector 5 to the auxiliary consuming device 6. This results in a pressure build-up within the hydraulic medium. Accordingly, the hydraulic medium present within the connector 5, the annular chamber 29, the diametrical bore 45, and line 31 is thus pressurized. Accordingly, a corresponding pressure is also generated in the pressure chamber 21 so that this increased pressure also acts on the main piston 10. This results in an increased hydraulic force acting on the right end face (in the drawing) of the main piston 10 in addition to the force of the pressure spring 13. The main piston 10 is thus displaced to the left (in the drawing) by this increased force. The flow cross-section for the hydraulic medium from the annular groove 14 of the main piston 10 into the annular chamber 28 is thus reduced. The pump 7 accordingly must operate at a higher pressure which will be adjusted to the pressure at which the auxiliary consuming device 6 is operating. The throttles 52 become larger so that a correspondingly greater amount of hydraulic fluid can flow via the described auxiliary connection to the auxiliary consuming device 6. The increased pressure of the hydraulic medium acts also via the line 32 onto the left end face (in the drawing) of the main piston 10 which then counteracts the pressure, i.e., the force of the spring and the hydraulic force, acting on the right end face of the main piston. Due to these counteracting forces acting on the two end faces the main piston 10 remains in its new position.

When the main piston 10 in the aforedescribed manner is displaced after switching on the auxiliary consuming device 6, the cross-section of the throttles 52 is enlarged at the same time so that a greater amount of hydraulic fluid can flow to the auxiliary piston 36. Accordingly, the pressure in the chamber 42 is increased so that the auxiliary piston 36 is displaced to the left (in the drawing). Thus, the flow cross-section into the annular chamber 44 of the main piston 10 is increased so that a correspondingly greater amount of hydraulic medium can flow via the transverse bore 45, the connector 5, and line 49 to the auxiliary consuming device 6. The auxiliary piston 36 is in this manner automatically adjusted so that the required pressure is supplied to the auxiliary consuming device 6.

When additionally the main consuming device 4 is turned on, the pressure of the hydraulic medium in the line 48 to the main consuming device 4 will increase. Via the annular groove 14 and the line 32 the increasing pressure of the hydraulic medium acts on the left end face of the main piston 10. The main piston 10 is thus displaced against the force of the pressure spring 13 and the pressure presently occuring within the pressure chamber 21, when the pressure increase in the line 48 to the main consuming device 4 becomes greater than the total force acting on the main piston within the pressure chamber 21. Due to this displacement of the main piston 10, the flow cross-section for the hydraulic medium from the annular groove 14 into the annular chamber 28 and into the line 48 is increased so that the required amount of hydraulic medium for the operation of the main consuming device 4 is reliably supplied.

In order to prevent that the pressure within the auxiliary connection to the auxiliary consuming device 6 is reduced upon activation of the main consuming device 4, the throttles 52, respectively, the orifice plates 51, of the main piston 10 are designed such that upon displacement of the main piston 10 the throttle cross-section is only slightly reduced. It is thus ensured that upon activation of the main consuming device 4, despite the displacement of the main piston 10, a sufficient amount of hydraulic medium is supplied to the auxiliary consuming device 6.

When the auxiliary consuming device 6 is turned off while the main consuming device 4 is still turned on, the hydraulic medium flows pressureless to the reservoir 8', since now the switch valve 50 is turned off. Via the annular chamber 29 and the line 31 the pressure chamber 21 of the valve housing 1 is thus also without pressure. The main piston 10 is then displaced against the force of the pressure spring 13 into its rest position represented in FIG. 1 by the pressure acting within the pressure chamber 33. Accordingly, the flow cross-section of the throttles 52 is thus returned to its smallest value so that accordingly also a pressure loss within the annular chamber 30 of the valve housing 1 as well as within the chamber 42 of the main piston 10 occurs. Thus, the pressure difference between the pressure chamber 33 and the chamber 42 is increased so that the auxiliary piston 36 is returned against the force of the pressure spring 37 into its rest position. Accordingly, the flow cross-section from the annular groove 39 of the auxiliary piston 36 to the angular chamber 44 of the main piston 10 is reduced so that for the switched-off auxiliary consuming device 6 only the aforementioned small amount of hydraulic medium flows via the line 49 to the reservoir 8'.

The safety device 18 which is connected within the main piston 10 ensures that the main consuming device can be operated even when the main piston. 10 remains jammed in a position in which a sufficient amount of pressure cannot be produced within the line 48 to the main consuming device 4. In general, the valve component 17 is maintained in the aforementioned manner in its closed position represented in the drawings. Due to the substantially greater diaphragm surface area at which the valve component 17 rests it remains also in its closed position when only a relatively low pressure is present within the pressure chamber 21. Should the main piston 10, for example, due to contamination within the hydraulic medium, remain jammed in the valve bore 9 so that in the line 48 to the main consuming device 4 an insufficient pressure will be generated, then the pressure within the pressure chamber 21 is also correspondingly low, respectively, there is no pressure present within the pressure chamber 21. Accordingly, no corresponding pressure acts on the diaphragm 19 so that the valve component 17 is lifted off its valve seat due to the pressure present within the axial bore 16. Thus, the pressurized hydraulic medium of the pump connection 2 can flow via the line 47, the annular groove 14 of the main piston 10, the transverse bore 15, and the axial bore 16 to the diametrical bore 53 of the main piston 10. From there the hydraulic medium can flow via the annular chamber 28 of the valve housing 1 into the line 48 to the main consuming device 4. Accordingly, with the safety device 18 a safety line is opened through which the hydraulic medium under sufficient pressure can flow to the main consuming device 4, should the main piston 10 be jammed and the flow cross-section from the annular groove 14 of the main piston 10 into the annular chamber 28 of the valve housing 1 be too small.

Figure 2:
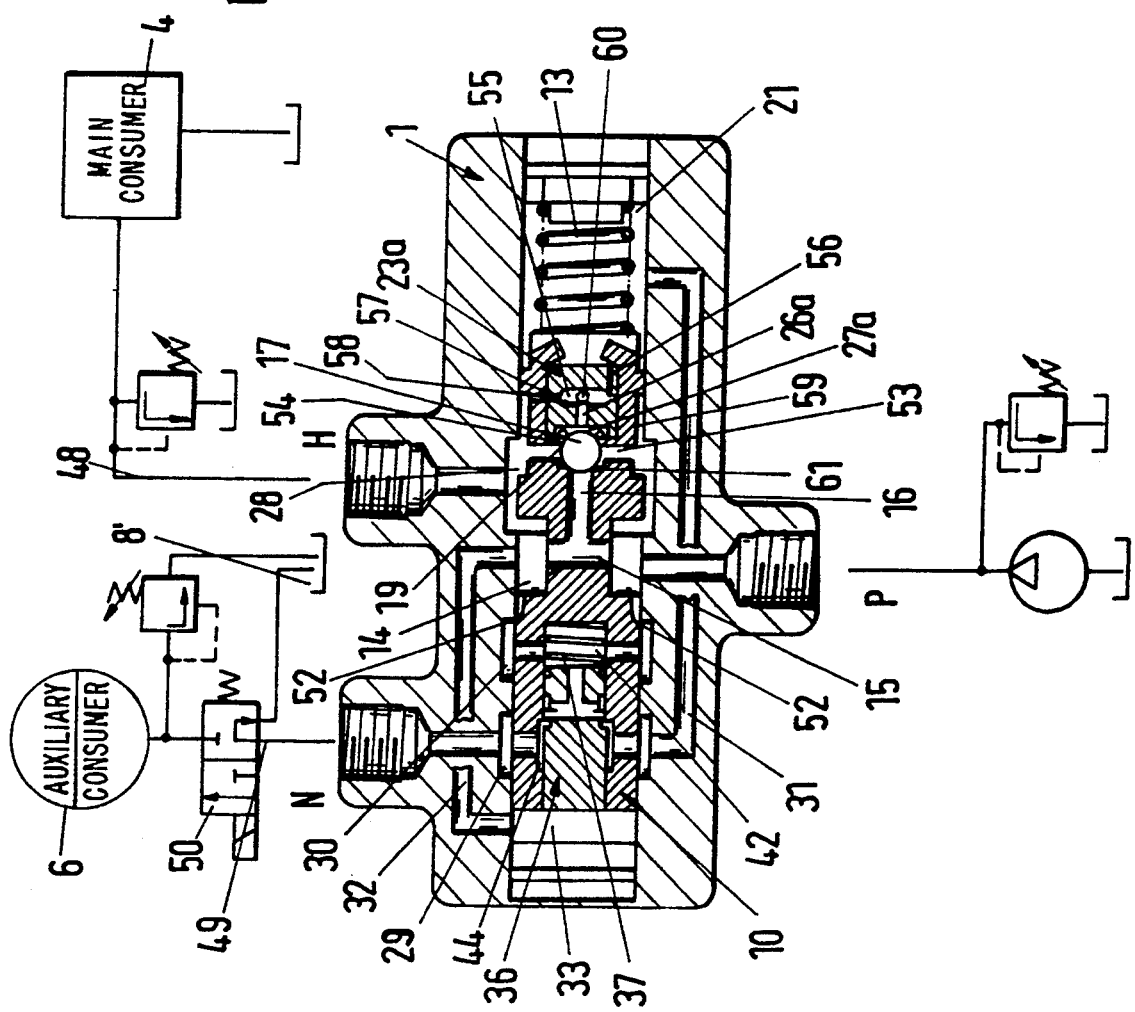
FIG. 2 is an axial section of a second embodiment of the inventive volume flow control.

The embodiment according to FIG. 2 is substantially identical to the embodiment of FIG. 1. Therefore, same parts are indicated with same reference numerals. In the following only the differences between the two embodiments will be explained in detail.

The clamping piece 23a has a receiving room 55 which is connected with the axial bore 26a to the pressure chamber 27a. Two bores 56 and 57 open into the receiving room 55, whereby the bore 56 connects the receiving room 55 with the pressure room 21. The bore 57 is aligned with a bore 58 within the main piston 10 which opens into an annular groove 59 of the main piston 10. In the receiving room 55 a valve ball 60 is arranged which, in a manner to be described infra, depending on the pressure present will close one of the bores 56, 57 opening into the receiving room 55. The clamping piece 23a together with the valve ball 60 represents a switching valve that ensures that the valve component 17 upon proper operation of the control remains in the closed position represented in the drawing.

In the rest position (FIG. 2) the hydraulic medium present within the pressure chamber 21 flows through the bore 56 into the receiving room 55 and from there through axial bore 26a of the clamping piece 23a against the diaphragm 19 at which the valve component 17 rests. The diaphragm surface area which is in contact with the valve component 17 is substantially greater than the surface are of the valve component 17 that is loaded by the hydraulic medium in the axial bore 16 of the main piston 10 so that the valve component 17 is securely held in the closed position represented in the drawing. The hydraulic medium flows furthermore from the annular chamber 28 of the valve housing 1 into the diametrical bore 53 of the main piston 10 which at half length is provided with the receiving room 54 for the valve component 17 that is connected with the axial bore 16. Via this flow connection the hydraulic medium can thus flow also into the receiving room 54. The diametrical bore 53 opens into the annular groove 59 of the main piston 10 which, in the position shown in FIG. 2, is in communication with the annular groove 14 of the main piston 10.

When the auxiliary consuming device 6 is switched on, the hydraulic medium flows via the line 31 into the pressure chamber 21 and from there via the bore 56 into the receiving room 55 of the clamping piece 23a. Since no pressure is generated within the connection to the main consuming device 4, the valve ball 60 within the receiving room 55 is forced against the opening of the bore 57 and thereby closes the bore. In this manner it is ensured that the high pressure within the receiving room 55 is maintained and can act via the axial bore 26a on the valve component 17. The valve component 17 is thus securely held in its closed position in which it closes off the axial bore 16 of the main piston 10.

When the main consuming device 4 is now turned on, the pressure of the hydraulic medium within the line 48 to the main consuming device 4 increases. Via the annular groove 14 and the line 32 the increasing pressure acts on the left end face of the main piston 10. The main piston 10 is thus displaced against the force of the pressure spring 13 and the pressure present within the pressure chamber 21, when the pressure increase in the line 48 to the main consuming device 4 is greater than the total pressure acting within the pressure chamber 21 of the main piston 10. Due to this displacement of the main piston 10, the flow cross-section for the hydraulic medium from the annular groove 14 into the annular groove 28 and into the line 48 is increased so that the required amount of hydraulic medium necessary for the operation of the main consuming device 4 is provided.

The increased pressure of the hydraulic medium acts via the transverse bore 15 and the axial bore 16 on the valve component 17. Simultaneously, the hydraulic medium flows via the annular groove 59 and the bore 57 into the receiving room 55. The valve ball 60, due to the increased pressure of the hydraulic medium, is forced against the opening of bore 16 and accordingly closes it. In the receiving room 55 the high pressure is present which acts via the axial bore 26a onto the valve component 17. In connection with the greater membrane surface area which rest at the valve component 17 the valve component is thus reliably maintained in its closed position.

When the auxiliary consuming device 6 is turned off while the main consuming device 4 is still in operation, the hydraulic medium flows, since now the switch valve 50 is turned off, in the aforedescribed manner without pressure into the reservoir 8'. Accordingly, the pressure chamber 21 of the valve housing 1 also looses its pressure via the annular chamber 29 and the line 31. The main piston 10 is thus returned against the force of the pressure spring 13 into the rest position represented in FIG. 2 due to the pressure acting in the pressure chamber 33. Thus, the flow cross-section of the throttles 52 is again returned to the smallest possible value so that a pressure loss within the annular chamber 30 of the valve housing 1 as well as within the chamber 42 of the main piston 10 occurs. Thus, the pressure difference between the pressure chamber 33 and the chamber 42 increases so that the auxiliary piston 36 is returned into its rest position against the force of the pressure spring 37. The flow cross-section from the annular groove 39 of the auxiliary piston 36 to the annular chamber 44 of the main piston 10 is then reduced so that for the turned-off auxiliary consuming device 6 only the aforementioned small amount of hydraulic medium flows via line 49 to the reservoir 8'.

Via the annular groove 59 and the bore 57 the high pressure present at the line 48 to the main consuming device 4 still acts on the valve component 17 which is thus maintained in the aforementioned manner in its closed position.

In this embodiment the safety device 18 which is connected within the main piston 10 also ensures that the main consuming device 4 can be operated even when the main piston 10 is jammed in a position in which the line 48 to the main consuming device 4 cannot provide a sufficient pressure. During normal operation, the valve component 17 is maintained in its closed position in the aforementioned manner shown in FIG. 2.

When the main piston 10, for example, due to contaminations within the hydraulic medium, should jam within the valve bore 9 so that the line 48 to the main consuming device 4 cannot generate sufficient pressure, the pressure within the receiving room 55 is correspondingly low, respectively, no pressure is present within the receiving room 55. Accordingly, no corresponding pressure acts on the diaphragm 19 so that the valve component 17 due to the pressure present within the axial bore 16 is lifted off its valve seat 61. Thus, the pressurized hydraulic medium can flow from the connector 2 of the pump 7 via the line 47, the annular groove 14 of the main piston 10, the transverse bore 15, and the axial bore 16 to the diametrical bore 53 of the main piston 10. From there, the hydraulic medium can flow via the annular chamber 28 of the valve housing 1 into the line 48 to the main consuming device 4. With the safety device 18 a safety line is thus opened through which the hydraulic medium under a sufficient pressure can flow to the main consuming device 4 when the main piston 10 jams and the flow cross-section from the annular groove 14 of the main piston 10 into the annular chamber 28 of the valve housing 1 is too small.

The described volume flow control is extremely compact and simple in construction. Since the auxiliary piston 36, with which the flow of the hydraulic medium to the auxiliary consuming device 6 is controlled, is positioned within the main piston 10 no additional construction space is required. The safety device 18 is also positioned within the main piston 10 so that for this device there is also no need for extra space. Only one pump 7 is required for both the main consuming device 4 and the auxiliary device 6 so that the constructive expenditure for the inventive volume flow control is simplified and cheaper. The supply of the hydraulic medium to the auxiliary consuming device is possible independent of the operational pressure at the main consuming device 4 so that at all times the required amount of hydraulic medium is supplied to the auxiliary consuming device 6. The throttles 52 of the main piston 10 are positioned upstream of the auxiliary piston 36 which with one end face, i.e., positioned at the pressure chamber 33, is subjected in the aforedescribed manner to the operational pressure and with its other end face, i.e., positioned at the chamber 42, is subjected to the reduced pressure resulting from the throttles 52. Due to the pressure spring 37 of the auxiliary piston 36 a balanced position of the auxiliary piston 36 is automatically adjusted such that to the auxiliary consuming device 6 substantially a constant amount of hydraulic fluid is supplied. When the auxiliary consuming device 6 is turned on, a dependency of the amount of hydraulic medium flow to the auxiliary consuming device from the operational pressure at the main consuming device 4 is not present. Independent of the operational pressure the same amount of hydraulic fluid can always be supplied to the auxiliary consuming device 6 when turned on. This, in turn, results in that the main consuming device 4 can always be supplied with the same amount of hydraulic medium independent of the operational pressure. Accordingly, an optimal supply of hydraulic medium to the main consuming device 4 is ensured.

With the safety device 18 it is ensured that the main consuming device 4 in each situation can be supplied with hydraulic medium. For supplying the hydraulic medium to the auxiliary consuming device 6 only a small amount of hydraulic medium as compared to the amount supplied to the main consuming device 4 is required. When the auxiliary consuming device 6 is not turned on, then the hydraulic medium is supplied within the auxiliary connection only in an amount of, for example, 100 cm$^3$/min. while, on the other hand, an amount of, for example, 8000 cm$^3$/min. is supplied to the main consuming device 4. When the auxiliary consuming device 6 is turned on, then an amount of, for example, 1000 cm$^3$/min. is supplied to the auxiliary consuming device 6 so that there is still a supply of, for example, 7000 cm$^3$/min. present for the main consuming device 4. The pressure of the hydraulic medium in the auxiliary connection is prestressed in the aforementioned manner with the aid of the main piston 10. The inventive device may be provided with further auxiliary consuming devices for which a respective further auxiliary piston is needed. Even in this case only one pump 7 is required for the main consuming device 4 and the respective auxiliary consuming devices 6.

In another embodiment, which is not represented in the drawings, the auxiliary piston 36 may be provided in a separate valve bore or in a separate valve housing. In this embodiment, the pressure chamber 33 in front of the main piston 10 is connected with a respective pressure chamber in front of the auxiliary piston. At the opposite end face of the auxiliary piston, the chamber in which the pressure spring 37 for the auxiliary piston is provided is connected with the annular chamber 30 of the valve housing 1. Furthermore, a connection is provided between a line extending to the auxiliary consuming device from the auxiliary piston to the pressure chamber 21 of the valve housing. In such an embodiment, the main flow is prestressed as a function of the required pressure within the auxiliary connection with the aid of the main piston which is also embodied as a pressure differential slide. Accordingly, in the auxiliary connection to the auxiliary consuming device a pressure generation is possible. The main piston is provided with a throttle groove for the auxiliary piston for generating the prestress of the auxiliary connection. The throttle cross-section can be changed according to the required conditions as a function of the position of the main piston. The hydraulic medium within the auxiliary connection flows in this embodiment to the reservoir until the switch valve of the auxiliary consuming device in the auxiliary connection is turned on and at the same time the connection to the reservoir is shut off. At this moment the pressure chamber 21 is pressurized behind the main piston 10 in the manner as described in connection with the drawings so that the main piston is displaced, thereby reducing the main flow. Accordingly, the throttle location 52 is enlarged so that the pressure differential on both sides of the auxiliary piston is reduced. Accordingly, the auxiliary piston, as described above in connection with the illustrated embodiments, is displaced thereby increasing the volume flow to the auxiliary consuming device. When in this switching position the pressure within the main connection to the main consuming device 4 surpasses the pressure within the auxiliary connection, the closed position of the main piston 10 is opened according to the pressure ratio in the aforedescribed manner.

This non-represented variant has advantageously a safety device 18 that ensures that the main consuming device, when the auxiliary consuming device is switched off, can always be reliably operated.

The present invention is, of course, in no way restricted to the specific disclosure of the specification and drawings, but also encompasses any modifications within the scope of the appended claims.

What we claim is:

1. A volume flow control for a hydraulic system of a vehicle, comprising:
   a pump for supplying a main consuming device and an auxiliary consuming device with a hydraulic medium;
   a valve having a main connection for connecting said pump to the main consuming device and an auxiliary connection for connecting said pump to the auxiliary consuming device;
   said valve comprising a main piston, said main piston forming a throttle, and an auxiliary piston positioned downstream of said throttle;
   said throttle positioned in said auxiliary connection;
   said auxiliary piston having a first end face, subjected to an operational pressure of the hydraulic medium, and a second end face, biased by at least one pressure spring and subjected to a reduced pressure of the hydraulic medium caused by said throttle, so that said auxiliary piston is positioned such that, independent of the operational pressure, a substantially constant amount of hydraulic medium is supplied to the auxiliary consuming device when switched on.

2. A volume flow control according to claim 1, wherein said main piston has a first end face that is subjected to the same operational pressure as said first end face of said auxiliary piston.

3. A volume flow control according to claim 2, wherein:
said second end face of said auxiliary piston delimits a chamber;
said valve has a pressure chamber for receiving a pressure spring therein for biasing said main piston; and
said chamber delimited by said auxiliary piston and said pressure chamber of said main piston communicating with one another.

4. A volume flow control according to claim 3, wherein said auxiliary piston is slidably connected within said main piston.

5. A volume flow control according to claim 4, wherein said first end face of said main piston has a recess in which recess said auxiliary piston is positioned.

6. A volume flow control according to claim 5, wherein a pressure spring for biasing said auxiliary piston is positioned in said chamber delimited by said auxiliary piston and is supported at a bottom of said recess.

7. A volume flow control according to claim 3, wherein:
said auxiliary piston has an annular groove and a connecting line extending axially in said auxiliary piston for connecting said chamber delimited by said auxiliary piston with said annular groove;
said auxiliary connection comprises a connector for the auxiliary consuming device; and
said annular groove communicating with said connector for said auxiliary consuming device.

8. A volume flow control according to claim 7, wherein said annular groove of said auxiliary piston is connected by at least one line to said pressure chamber of said main piston.

9. A volume flow control according to claim 1, further comprising a safety device for opening a safety line connecting said pump to said main consuming device when said main piston 10 jams.

10. A volume flow control according to claim 9, wherein said safety device is connected within said main piston.

11. A volume flow control according to claim 9, wherein said main piston has an annular groove that is connected via said safety line to an inlet line of the main consuming device.

12. A volume flow control according to claim 11, wherein said annular groove of said main piston has said throttle.

13. A volume flow control according to claim 9, wherein said safety line is comprised of bores extending through said main piston.

14. A volume flow control according to claim 9, wherein said safety device comprises a valve component for closing said safety line.

15. A volume flow control according to claim 14, wherein said valve component is a valve ball.

16. A volume flow control according to claim 14, wherein said safety device comprises a diaphragm at which said valve component rests and wherein a pressure acting on a side of said diaphragm opposite said valve component is controlled by a switch valve.

17. A volume flow control according to claim 16, wherein a surface area of said valve component subjected to the pressure of the hydraulic medium in said safety line is smaller than an oppositely arranged surface area of said diaphragm at which said valve component rests.

18. A volume flow control according to claim 1, wherein the hydraulic medium within said auxiliary connection flows back into a reservoir when said auxiliary consuming device is turned off.

* * * * *